(12) United States Patent
Kikuchi

(10) Patent No.: US 7,129,707 B2
(45) Date of Patent: Oct. 31, 2006

(54) APPARATUS FOR JUDGING STATE OF ASSEMBLED BATTERY

(75) Inventor: Yoshiaki Kikuchi, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/489,201

(22) PCT Filed: Oct. 9, 2002

(86) PCT No.: PCT/JP02/10488

§ 371 (c)(1),
(2), (4) Date: Mar. 10, 2004

(87) PCT Pub. No.: WO03/041210

PCT Pub. Date: May 15, 2003

(65) Prior Publication Data

US 2004/0239333 A1 Dec. 2, 2004

(30) Foreign Application Priority Data

Nov. 9, 2001 (JP) ........................... 2001-345260

(51) Int. Cl.
G01N 37/416 (2006.01)

(52) U.S. Cl. ...................................... 324/426

(58) Field of Classification Search ......... 324/426–433; 320/116; 361/79
See application file for complete search history.

(56) References Cited

U.S. PATENT DOCUMENTS 4,590,430 A * 5/1986 Vandenberghe et al. .... 324/427

6,477,024 B1 * 11/2002 Kikuchi et al. ............... 361/79

FOREIGN PATENT DOCUMENTS

| EP | 1 037 063 | 9/2000 |
|---|---|---|
| JP | 9-015311 | 1/1997 |
| JP | 10-106635 | 4/1998 |
| JP | 11-178225 | 7/1999 |
| JP | 2000-150002 | 5/2000 |

OTHER PUBLICATIONS

Konya et al., A Deterioration Estimating System for 200 Ah Sealed Lead–Acid Batteries, IEEE Conference, Oct. 30, 1994, pp. 256–262.*

* cited by examiner

Primary Examiner—Pia Tibbits
(74) Attorney, Agent, or Firm—Kenyon & Kenyon LLP (57) ABSTRACT

For the measurement of the voltage of each block which constitutes a battery pack with different timings, a voltage (V) and current (I) every block the current of which is measured at the same timing as the voltage is measured are read (S100–S108) and an inner resistance (R) is derived from the temperature (T) of the assembled battery (S110, S112). A value of the difference $(I_N - I_{N+1})$ of two currents corresponding to two voltages of respective blocks of a plurality of battery blocks multiplied by the inner resistance (R) of the battery pack is added to the difference $(V_N - V_{N+1})$ of two voltages to calculate the voltage difference $\Delta V$ (S116). When the maximum value $\Delta V$max of the calculated voltage difference $\Delta V$ exceeds the threshold value Vref, the state is judged to be an overdischarge (S122, S124, S128).

6 Claims, 9 Drawing Sheets

APPARATUS FOR JUDGING STATE OF ASSEMBLED BATTERY

This is a 371 application of PCT/JP02/10488 filed 9 Oct. 2002, which claims priority to Japanese patent application No. 2001-345260 filed 9 Nov. 2001, the contents of which are incorporated herein by reference in their entirety.

TECHNICAL FIELD

The present invention relates to an apparatus for judging the state of an assembled battery, and more particularly to an apparatus for judging the state of an assembled battery composed of a plurality of battery blocks connected in series.

BACKGROUND ART

Conventionally, as an apparatus for judging the state of an assembled battery of this kind, the following apparatus has been proposed. That is, a voltmeter is attached to each of a plurality of battery blocks composed of one or a plurality of single cells constituting an assembled battery for supplying power to a load. The voltmeter is used for measuring the voltage of each of the plural battery blocks simultaneously. Then, the apparatus judges an abnormality of the assembled battery on the basis of the respective voltages measured simultaneously. When a deviation of two voltages among the respective voltages measured simultaneously is equal to a predetermined value or more, the apparatus considers that there is an overdischarged single cell, and judges the assembled battery to be abnormal.

However, the apparatus for judging the state of an assembled battery of this type has the possibility of misjudgment of an abnormality of the assembled battery when each voltage of a plurality of battery blocks cannot be simultaneously measured. That is, because the single cells of the battery blocks include internal resistance, there may be cases where a deviation of voltages equal to the predetermined value or more is produced though the assembled battery when the current flowing the assembled battery changes in a process of measuring each voltage of the plural battery cells, and this in fact normal. The possibility of the misjudgment is based on the above matter. Such a problem is highlighted in the system in which the current flowing an assembled battery greatly changes.

An apparatus for judging the state of an assembled battery of the present invention has an advantage of solving such a problem and to perform the accurate judgment of the state of a battery by the use of an apparatus which cannot simultaneously detect each voltage of a plurality of battery blocks. Moreover, the apparatus for judging the state of an assembled battery of the present invention has another advantage of performing the accurate judgment of the state of a battery by the use of a more inexpensive apparatus.

DISCLOSURE OF THE INVENTION

An apparatus for judging the state of an assembled battery of the present invention may adopt the following aspects capable of obtaining at least some of the advantages.

According to one aspect of the present invention, an apparatus for judging a state of an assembled battery of the present invention is an apparatus for judging a state of an assembled battery composed of a plurality of battery blocks connected in series, the apparatus comprising:

voltage measuring means for measuring respective voltages of the plural battery blocks at different times;

current measuring means for measuring currents flowing through the assembled battery; and state judgment means for judging the state of the assembled battery by means of the respective voltages of the plural battery blocks, which are measured by the voltage measuring means at the different times, and respective currents measured by the current measuring means correspondingly to the respective voltages at the same time as the respective voltages are measured.

According to another aspect of the present invention, the apparatus for judging the state of the assembled battery of the present invention judges the state of the assembled battery by means of the respective voltages measured by the voltage measuring means for measuring the respective voltages of the plural battery blocks at the different times, and respective currents measured by the current measuring means at the same time as the respective voltages are measured. Thereby, even when the voltage measuring means does not measure the respective voltages of the plural battery blocks simultaneously, the apparatus can correctly judge the state of the assembled battery. Hereupon, the "battery block" includes one composed of one cell (single cell) as well as one composed of a plurality of cells (single cells).

In another aspect of the apparatus for judging the state of the assembled battery of the present invention, it is also possible to configure the voltage measuring means to comprise: a voltmeter capable of detecting inter-terminal voltages of the battery blocks; and switching means capable of switching to a battery block to be detected by the voltmeter among the plural battery blocks. With such a configuration, the number of voltmeters can be reduced, and the apparatus for judging the state of the assembled battery can be configured to be inexpensive.

Moreover, in another aspect of the apparatus for judging the state of the assembled battery of the present invention, it is also possible to configure the state judgment means as means for judging existence of an overdischarge of the assembled battery on the basis of the respective voltages measured by the voltage measuring means, the respective currents measured by the current measuring means correspondingly to the respective voltages, and internal resistance of the assembled battery corresponding to a temperature of the assembled battery. In the apparatus for judging the state of the assembled battery of the present invention in this aspect, it is also possible to configure the state judgment means as means for judging the existence of the overdischarge of the assembled battery in consideration of voltage drops of the respective voltages owing to the respective currents and the internal resistance of the assembled battery from the respective voltages. In the apparatus for judging the state of the assembled battery of the present invention of this aspect, it is also possible to configure the state judgment means as means for correcting a deviation of two voltages among the respective voltages of the plural battery blocks on the basis of two currents corresponding to the two voltages among the respective currents and of the internal resistance to judge the overdischarge when an absolute value of the corrected deviation is larger than a predetermined value.

Moreover, in another aspect of an apparatus for judging the state of the assembled battery of the present invention, it is also possible to configure the apparatus to comprise storage means for storing the respective voltages of the plural battery blocks, which are measured by the voltage measuring means at the different times, and the respective currents measured by the current measuring means correspondingly to the respective voltages at same times as the respective voltages are measured as a plurality of coupled data items, each of which corresponds to each of the plural battery blocks, and to configure the state judgment means as means for applying a linear relationship between the voltages and the currents to each of the plural battery blocks on the basis of the plural coupled data stored in the storage means, and for calculating an open circuit voltage or internal resistance of each of the plural battery blocks on the basis of the applied linear relationships to judge existence of an abnormality of the assembled battery on the basis of the calculated open circuit voltage or the internal resistance of each of the battery blocks. In the apparatus for judging the state of the assembled battery of the present invention of this aspect, it is also possible to configure the state judgment means as means for judging the state of the assembled battery to be abnormal when an open circuit voltage difference in two blocks among the plural battery blocks is larger than a first predetermined value, or when an internal resistance voltage difference in two blocks among the plural battery blocks is larger than a second predetermined value.

Alternatively, in another aspect of an apparatus for judging the state of the assembled battery of the present invention, it is also possible to configure the apparatus to comprise: correction means for correcting a deviation of two voltages among the respective voltages of the plural battery blocks, which are measured by the voltage measuring means at the different times, on the basis of two currents corresponding to the two voltages among the respective currents measured by the current measuring means correspondingly to the respective voltages at same time as the respective voltages are measured, and of internal resistance of the assembled battery corresponding to a temperature of the assembled battery; and storage means for storing a plurality of coupled data items, each of which is composed of the corrected deviation of the two voltages and an average of the two currents corresponding to the two voltages, and to configure the state judgment means as means for applying a linear relationship between the deviations of the two voltages and the averages of the two currents of the plural battery blocks on the basis of the plural coupled data stored in the storage means, and for calculating an open circuit voltage difference or an internal resistance difference of two blocks of the plural battery blocks on the basis of the applied linear relationship to judge an abnormality of the assembled battery on the basis of the calculated open circuit voltage difference or the internal resistance difference. In the apparatus for judging the state of the assembled battery of the present invention of this aspect, it is also possible to configure the state judgment means as means for judging the state of the assembled battery to be abnormal when the open circuit voltage difference in the two blocks is larger than a first predetermined value, or when the internal resistance voltage difference in the two blocks is larger than a second predetermined value.

EXPLANATIONS OF REFERENCE NUMERALS

10: assembled battery; 12: load; 20: apparatus for judging a state; 22: voltage measurement instrument; 23: voltmeter; 24: switching circuit; 26: ampere meter; 28: thermometer; 30: electronic control unit; 32: CPU; 34: ROM; 36: RAM; 40: clock generation circuit; 50: LED; B1–Bn: battery block.

BEST MODE FOR CARRYING OUT THE INVENTION

Figure 1:
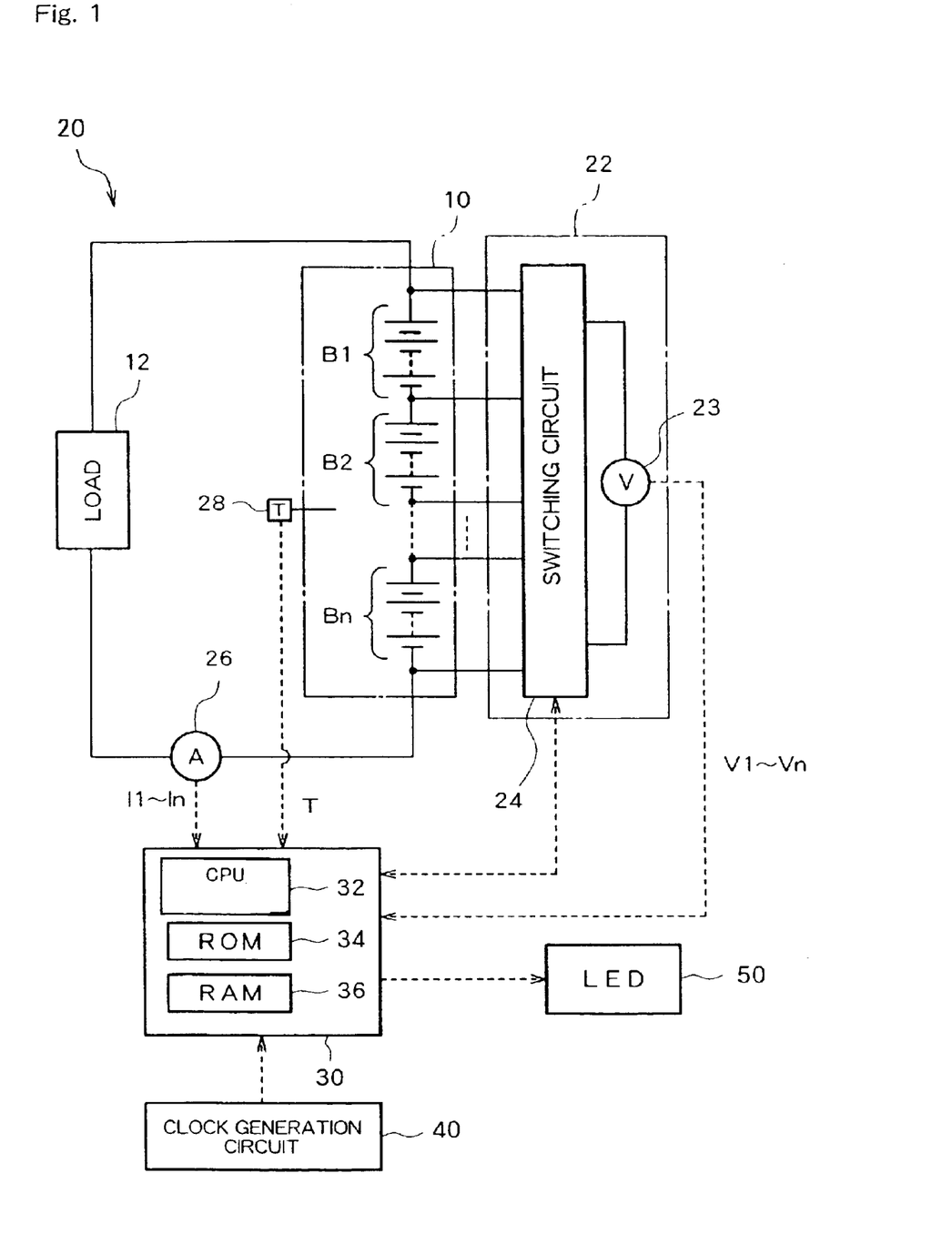
FIG. 1 is a block diagram showing the out line of a configuration of an apparatus 20 for judging the state of an assembled battery as an example of the present invention in the state of being attached to an assembled battery 10, the power of which is consumed or regenerated by a load 12.

Next, a preferred embodiment of the present invention will be described by the use of an example. FIG. 1 is a block diagram showing an outline of a configuration of an apparatus 20 for judging the state of an assembled battery as an example of the present invention in the state of being attached to an assembled battery 10, the power of which is consumed or regenerated by a load 12. As shown in the figure, the apparatus 20 for judging the state of the assembled battery of the example is equipped with a voltage measurement instrument 22 for detecting each of the interterminal voltages V1–Vn of battery blocks B1–Bn constituting the assembled battery 10 at different timing, an ampere meter 26 for detecting currents I1–In flowing through the assembled battery 10, a thermometer 28 for detecting a temperature T of the assembled battery 10, an electronic control unit 30 for judging abnormalities of the assembled battery 10 owing to an overdischarge, internal resistance, an electromotive force and the like on the basis of detection results of the voltage measurement instrument 22, the ampere meter 26, the thermometer 28 and the like, and an LED 50 as a display device.

Each of the battery blocks B1–Bn is composed of a cell (single cell) or a plurality of cells connected in series.

The voltage measurement instrument 22 is composed of a voltmeter 23 capable of detecting respective interterminal voltages V1–Vn of the battery blocks B1–Bn, and a switching circuit 24 capable of switching the connections between respective terminals of the battery blocks B1–Bn and the terminals of the voltmeter 23.

The electronic control unit 30 is constituted as a one-chip microprocessor comprising a CPU 32 as a main component. The electronic control unit 30 is equipped with a ROM 34 storing processing programs, a RAM 36 for storing data temporarily, and an input/output port (not shown). The voltages V1–Vn from the voltmeter 23, the currents I1–In from the ampere meter 26, the temperature T from the temperature sensor, a clock signal output from a clock generation circuit 40, and the like are input to the electronic control unit 30 through an input port. Moreover, a switch command signal as a command signal concerning the connection between the respective terminals of the battery blocks B1–Bn and the terminals of the voltmeter 23, a lighting signal to the LED 50 for making the LED 50 display a judgment result of the state of the assembled battery 10 by the apparatus 20 for judging the state, and the like are output from the electronic control unit 30 through an output port.

Figure 2:
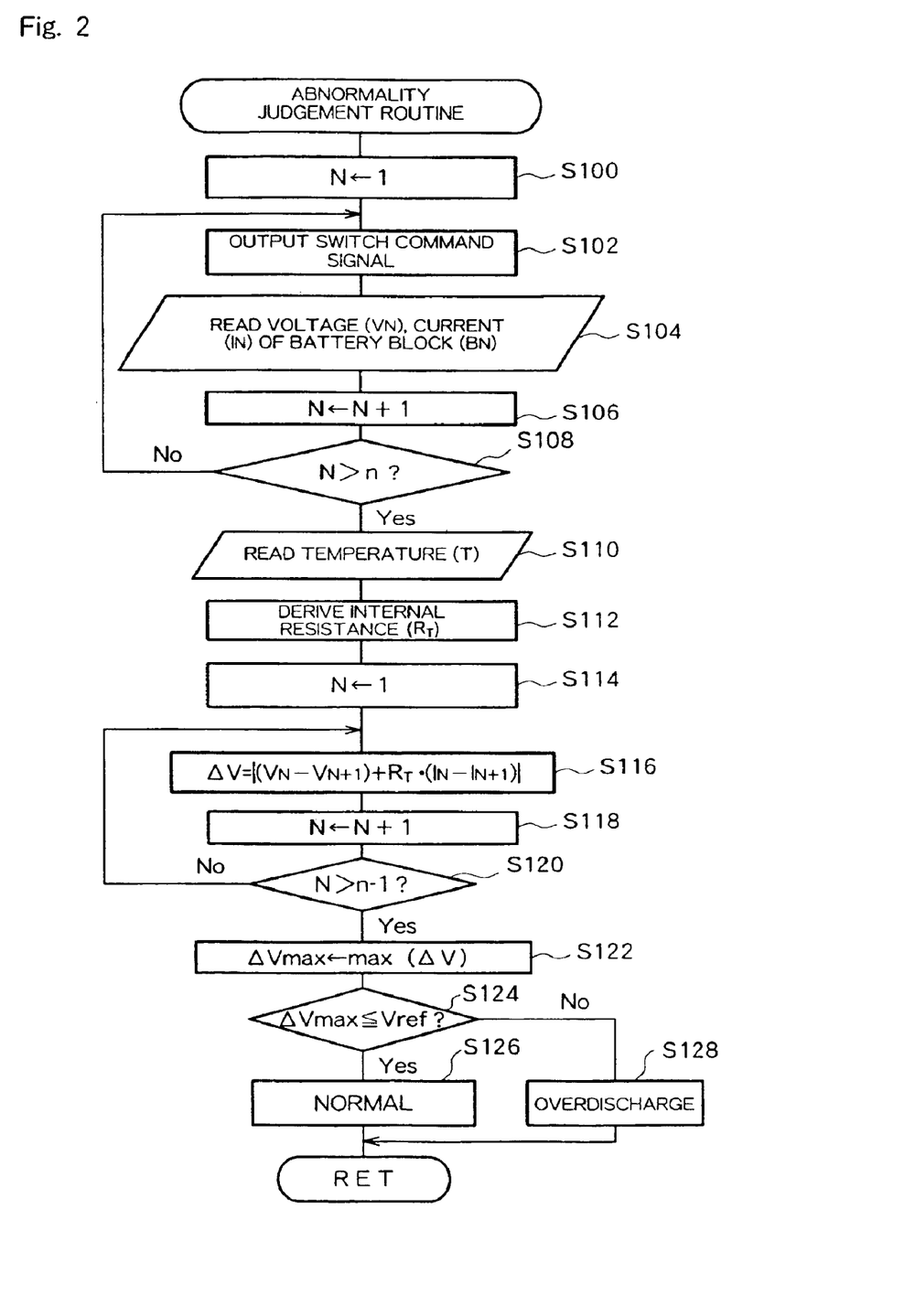
FIG. 2 is a flowchart showing an example of an abnormality judgment routine executed by an electronic control unit 30 of the apparatus 20 for judging the state of the assembled battery of the example.

The operation of the apparatus 20 for judging the state of the assembled battery of the example constituted as above will be described. In particular, the operation for judging whether or not any overdischarged cells exist in the assembled battery 10 will be described. FIG. 2 is a flowchart showing an example of an abnormality judgment routine executed by the electronic control unit of the apparatus 20 for judging the state of the assembled battery of the example. The execution of the routine is repeated every predetermined time.

Figure 3:
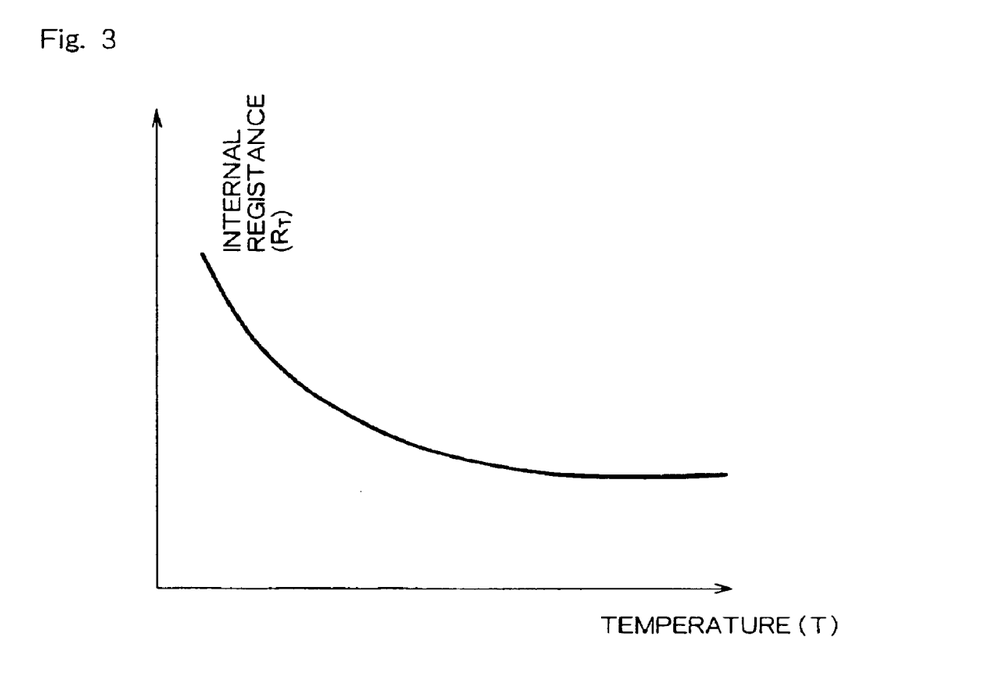
FIG. 3 is a map showing a relationship between temperature T of the assembled battery 10 and internal resistance $R_T$ of the assembled battery 10.

When the abnormality judgment routine is executed, the CPU 32 of the electronic control unit 30 first initializes a variable N, i.e. sets the variable N to be a value 1 (Step S100), and outputs an output switch command signal commanding to set a battery block BN corresponding to the variable N among the battery blocks B–Bn to be a detection object by the voltmeter 23 to the switching circuit 24 (Step S102). After outputting the switch command signal, the CPU 32 reads a voltage VN of the battery block BN detected by the voltmeter 23, and a current IN flowing through the assembled battery 10, or the current flowing through the battery block BN, which has been detected by the ampere meter 26 at the same time as detection by the voltmeter 23 (Step S104). Then, the CPU 32 increments the variable N (Step S106). Furthermore, the CPU 32 judges whether or not the variable N has exceeded the value n, or whether or not the CPU 32 has read the voltages V1–Vn of all of the battery blocks Bl–Bn and the currents I1–In corresponding to the voltages V1–Vn, respectively (Step S108). When the CPU 32 has not read the voltages V1–Vn of all of the battery blocks B1–Bn and the currents I1–In yet, the CPU 32 repeats the processing from Step S102 to Step S106 until the CPU 32 judges that the CPU 32 has read all of the voltages V1–Vn and the currents I1–In. When the CPU 32 has read all of the voltages V1–Vn and the currents I1–In of the battery blocks B1–Bn, the CPU 32 reads the temperature T of the assembled battery 10 detected by the thermometer 28 (Step S110). The CPU 32 derives the internal resistance $R_T$ of the assembled battery 10 from the read temperature T (Step S112). In the present example, a relationship between the temperatures T of the assembled battery 10 and the internal resistance $R_T$ of the assembled battery 10 has been obtained and stored in the ROM 34 as a map in advance. When the temperature T of the assembled battery 10 is given, the CPU 32 derives the corresponding internal resistance $R_T$ of the assembled battery 10 from the map. An example of the map is shown in FIG. 3. Incidentally, in the example, one thermometer is provided to the battery blocks B1–Bn of the assembled battery 10. However, a plurality of thermometers may be provided to the battery blocks B1–Bn in consideration of the temperature distribution of each of the battery blocks B1–Bn of the assembled battery 10.

When the CPU 32 has derived the voltages V1–Vn, the currents I1–In and the internal resistance $R_T$ of the respective battery blocks B1–Bn, the CPU 32 sets the value of the variable N to 1 (Step S114), and operates a voltage difference $\Delta V$ by the use of the following expression (Expression (1)) (Step S116). The CPU 32 increments the variable N (Step S118).

$$\Delta V = |(V_N - V_{N+1}) + R_T \times (I_N - I_{N+1})| \quad (1)$$

Until the variable N exceeds a value (n–1), or until the voltage differences $\Delta V$ over all of the battery blocks B1–Bn have been operated, the CPU 32 repeats the processing of Steps S116 and S118 (Step S120). The CPU 32 calculates the maximum voltage difference $\Delta V$max being the maximum value among the operated voltage differences $\Delta V$ (Step S122). The CPU 32 judges whether or not the calculated maximum voltage difference $\Delta V$max is equal to a threshold value Vref or less (Step S124). When the maximum voltage difference $\Delta V$max is equal to the threshold value Vref or less, the CPU 32 judges that there is no overdischarged cell in the assembled battery 10, namely judges that the assembled battery 10 is normal (Step S126), and then the CPU 32 ends the present routine. On the other hand, when the maximum voltage difference $\Delta V$max exceeds the threshold value Vref, the CPU 32 judges that there is an overdischarged cell in the assembled battery 10, namely judges that the assembled battery 10 is overdischarged, and, for example, outputs a lighting signal to the LED 50, which displays overdischarges (Step S128) to end the present routine. Here, the use of the maximum voltage difference $\Delta V$max as the judgment object of the overdischarges is based on the fact that the use of the maximum voltage difference $\Delta V$max as the judgment object makes it possible to judge whether or not at least any one of the cells in the assembled battery 10 has been overdischarged. Incidentally, when the CPU 32 specifies the battery block in which an abnormal cell exists, it is enough to perform the comparison of each voltage difference $\Delta V$ calculated at Step S116 with the threshold value Vref without deriving the maximum voltage difference $\Delta V$max.

Figure 4:
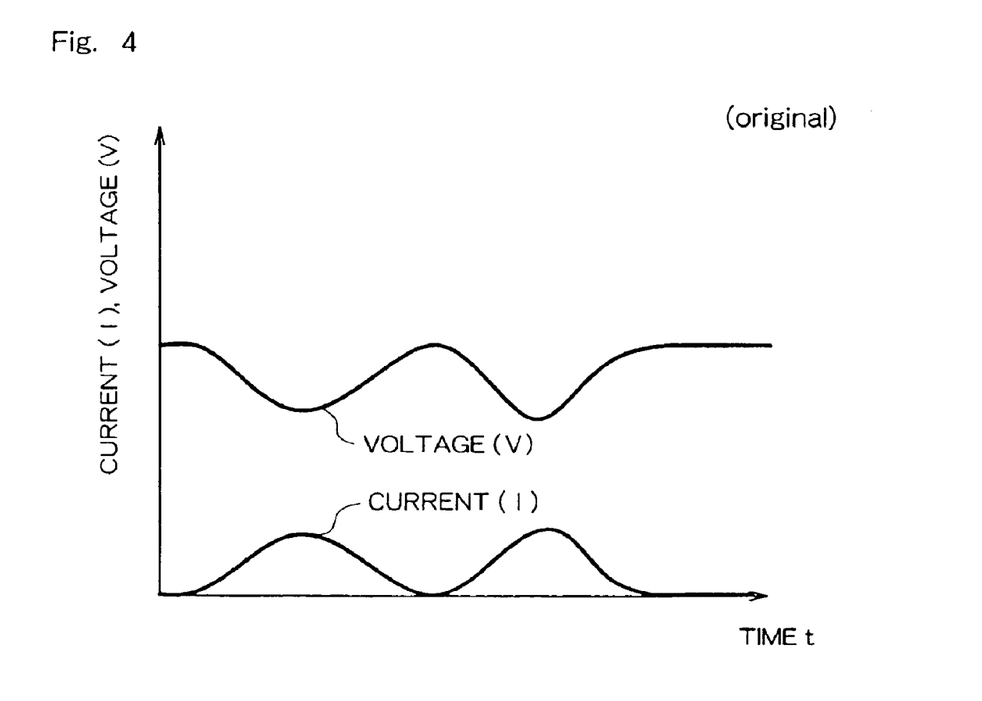
FIG. 4 is an explanatory view showing a relationship between interterminal voltage V and currents I of a battery block.

FIG. 4 is an explanatory view showing a relationship between interterminal voltages V and currents I of a battery block. As shown in FIG. 4, the voltage drop $R_T I$ owing to the internal resistance $R_T$ of the battery block becomes larger in proportion to the current I flowing through the battery block, and in turn the interterminal voltage V to be detected becomes smaller. Consequently, when the CPU 32 detects the interterminal voltage of each of a plurality of battery blocks at different times, and when the magnitude of the current flowing through the battery blocks varies during the detection process, then the quantity of the voltage drop included in each interterminal voltage differs. Consequently, if the existence of the overdischarges of the assembled battery is judged on the basis of only the interterminal voltage of each of the plural battery blocks when the interterminal voltage of each of the plural battery blocks is detected at a different time, the possibility of making erroneous judgments becomes high. Accordingly, if currents are detected at the same time as detection of each of the interterminal voltages, voltage drops can be calculated by means of the currents and the internal resistance derived from the temperature of the battery blocks. Accordingly, the influences of the magnitudes of the voltage drops on the interterminal voltages can be removed, and therefore the existence of the overdischarges of the assembled battery can be judged accurately.

As described above, the apparatus 20 for judging the state of an assembled battery of the example detects each of the currents I1–In of the battery blocks B1–Bn at the same time as detection of each of the voltages V1–Vn of the battery blocks B1–Bn, and judges the abnormalities of overdischarges in consideration of the voltage drop of each of the voltages V1–Vn on the basis of each of the currents I1–In and the internal resistance $R_T$ of the assembled battery 10. Consequently, even when each of the voltages V1–Vn of the battery blocks B1–Bn are detected at different times, the existence of the overdischarges can be judged exactly. The apparatus 20 for judging the state of an assembled battery as described above is especially effective for a system in which the changes of output required to the load 12 are large, or a system in which the changes of the current flowing through the assembled battery 10 are large.

Moreover, because the apparatuse 20 for judging the state of an assembled battery of the example detects the voltages V1–Vn of the respective battery blocks B1–Bn with the voltmeter 23 by switching the switching circuit 24, there is no need to provide voltmeters to each of the battery blocks B1–Bn, and making it possible to lower the cost of the apparatus.

Figure 5:
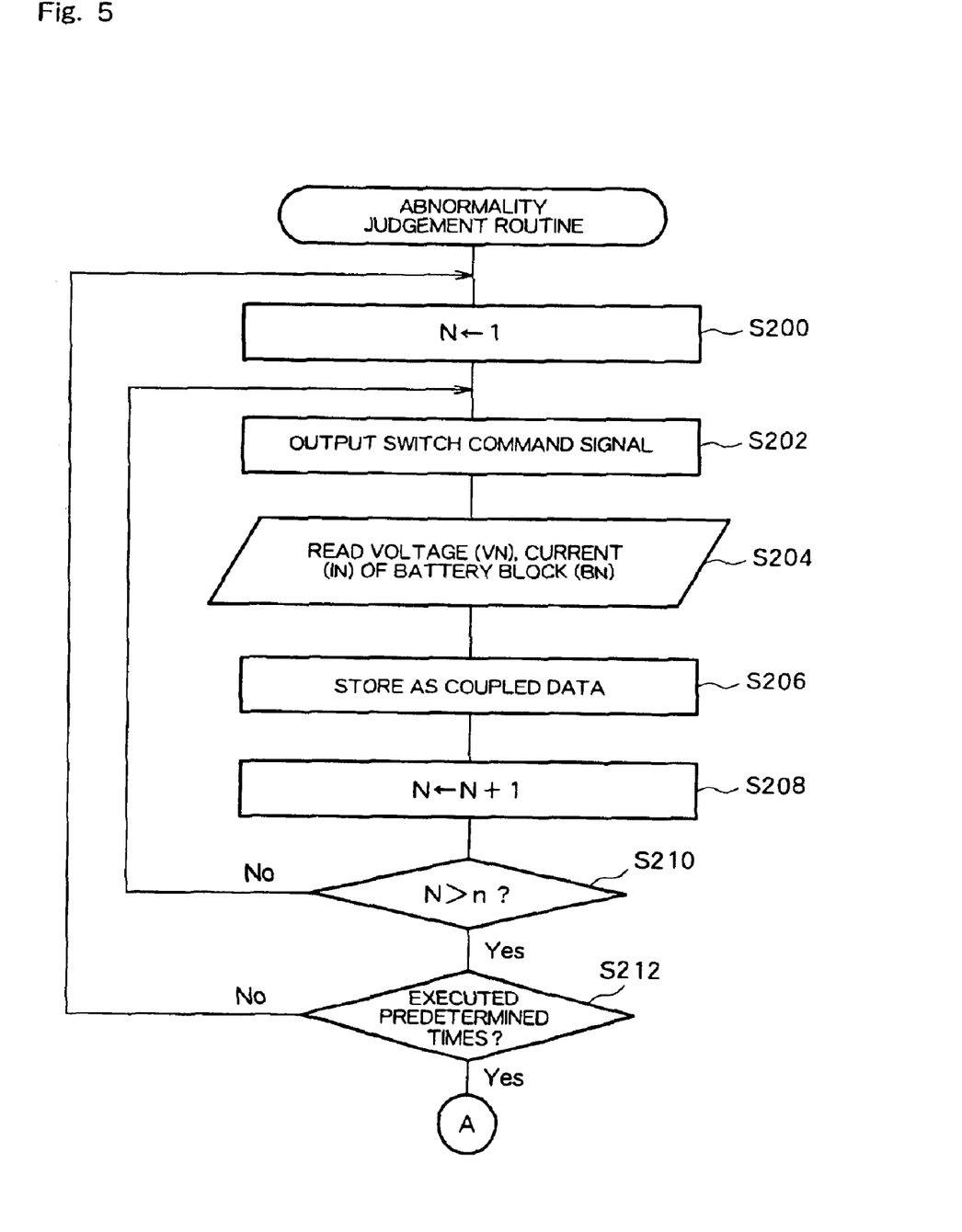
FIG. 5 is a flowchart showing an example of an abnormality judgment routine executed by the electronic control unit 30 of the apparatus 20 for judging the state of the assembled battery of the example.
Figure 6:
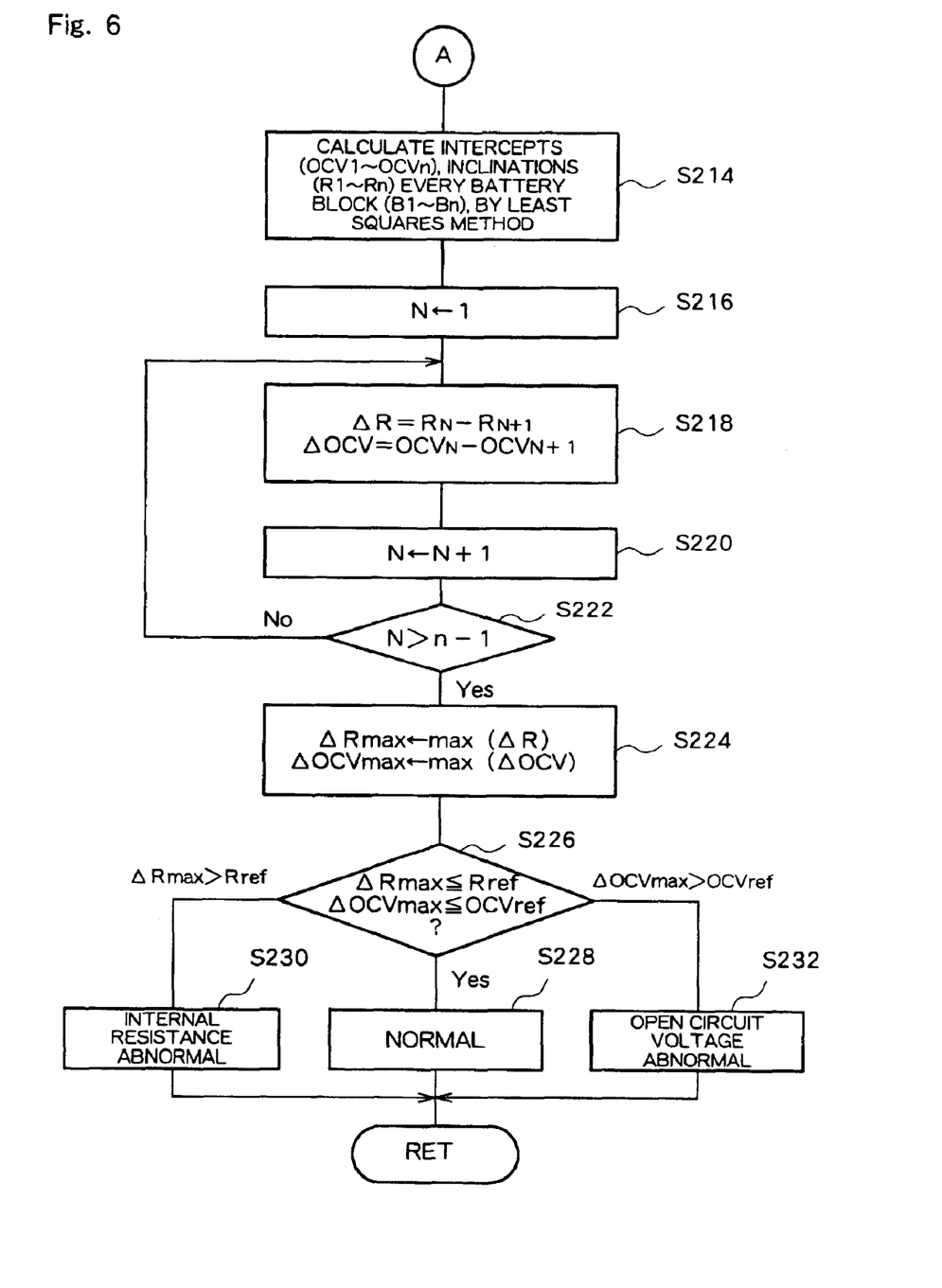
FIG. 6 is a flowchart showing the example of the abnormality judgment routine executed by the electronic control unit 30 of the apparatus 20 for judging the state of the assembled battery of the example.

Next, the operation of judging the existence of the abnormalities of the open circuit voltage and the internal resistance of each of the battery blocks B1–Bn of the assembled battery 10 will be described. FIGS. 5 and 6 are flowcharts showing an example of an abnormality judgment routine executed by the electronic control unit 30 of the apparatus 20 for judging the state of an assembled battery. The execution of the routine is repeated every predetermined time.

When the abnormality judgment routine is executed, the CPU 32 of the electronic control unit 30 first performs processing similar to the processing from Step S100 to Step S108 of the abnormality judgment routine in FIG. 2. That is, the CPU 32 sets the variable N to be a value 1 (Step S300), and outputs a switch command signal corresponding to the set value of the variable N (Step S302). The CPU 32 reads a voltage VN and an current IN of the battery block BN corresponding to the variable N (Step S304), and increments the variable N (Step S306). The CPU 32 repeats the processing from Step S302 to Step S306 until the variable N exceeds the value n, namely the CPU 32 has read the voltages V1–Vn of all of the battery blocks B1–Bn and the currents I1–In (Step S308). Then, the CPU 32 judges whether the processing from Step S300 to Step S308 has repeated a predetermined number of times or not (Step S310). The CPU 32 repeats the processing until the processing has been executed the predetermined number of times. The repetition of the processing from Step S300 to Step S308 the predetermined number of times is to obtain a plurality of coupled data, which will be described later, to perform operations using the least squares method. A numerical value for the predetermined number of times is set as the number of the coupled data sufficient for judging the abnormality of the assembled battery 10.

After the repetition of the processing the predetermined number of times, the CPU 32 reads the temperature T of the assembled battery 10 (Step S312), and derives the internal resistance $R_T$ of the assembled battery 10 from the read temperature T (Step S314). Incidentally, the processing of driving the internal resistance $R_T$ is the same as the processing at Steps S110 and S112 in the routine of FIG. 2.

Figure 7:
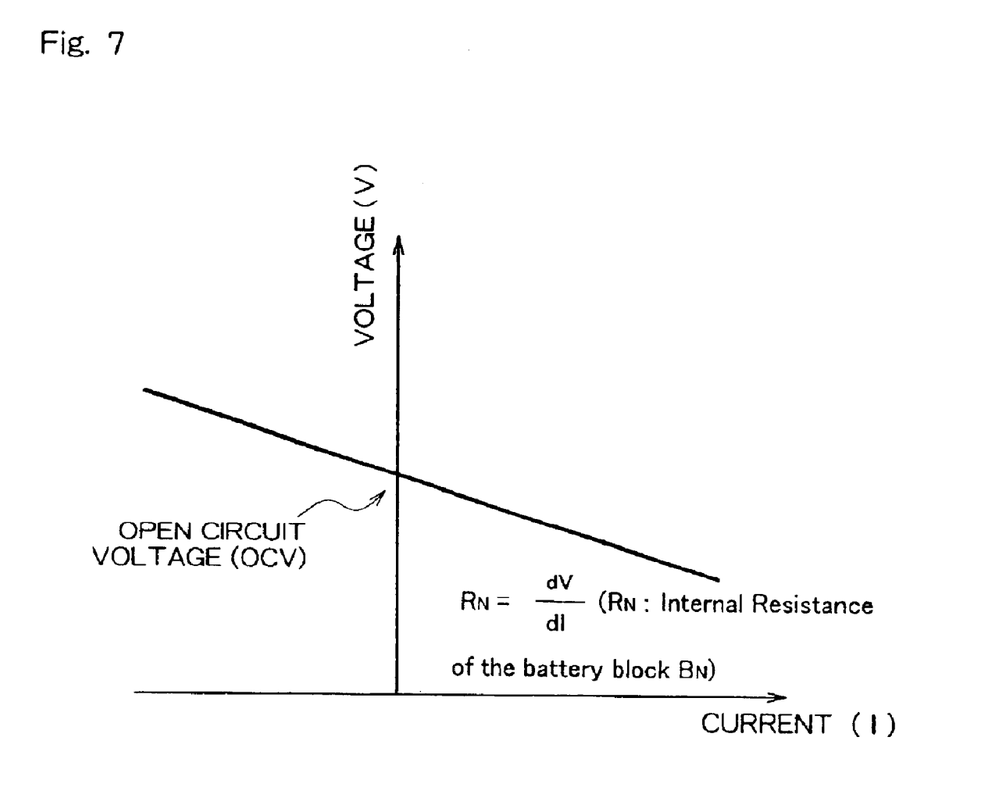
FIG. 7 is an explanatory view showing a relationship among voltage V, current I, an open circuit voltage OCV and internal resistance $R_N$.

When the CPU 32 has read the voltages V1–Vn of all of the battery blocks B1–Bn and the currents I1–In, the CPU 32 judges whether or not the processing from Step S200 to Step S210 has been repeated a predetermined number of times (Step S212). Then, the CPU 32 repeats the processing the predetermined number of times. The repetition of the processing from Step S200 to Step S210 is for obtaining a plurality of coupled data, each of which is stored for each of the battery blocks B1–Bn, to perform a calculation using the least squares method, which will be described later. The number of times of the predetermined times is set as the number of coupled data sufficient to judge the abnormality of the assembled battery 10. After the repetition of the processing the predetermined number of times, the CPU 32 calculates inclinations R1–Rn and intercepts OCV1–OCVn, each of which corresponds to each of the battery blocks B1–Bn, in accordance with the least squares method by the use of the plural coupled data of the voltages V1–Vn and the currents I1–In of respective battery blocks B1–Bn (Step S214). FIG. 7 is an explanatory view showing a relationship among voltages V, currents I, an open circuit voltage OCV and internal resistance R. Because the relationship among the voltage V, the current I, the internal resistance R and the electromotive force OCV can be shown as the relationship shown in FIG. 7, if a plurality of coupled data (voltages and currents) is stored for each of the battery blocks B1–Bn, then a linear relationship of voltage and current can be calculated for each of the battery blocks B1–Bn in accordance with the least squares method, and the internal resistance R and the electromotive force OCV, which are the inclination and the intercept of the linear relationship, respectively, can be derived.

After the deviation of the internal resistance R1–Rn and the electro motive forces OCV1–OCVn, each of which corresponds to each of the battery blocks B1–Bn, in the manner described above, the CPU 32 sets the value of the variable N to 1 (Step S216), and operates an internal resistance difference ΔR and an electromotive force difference ΔOCV by the use of the following expressions (Expressions (2) and (3)) (Step S218). The CPU 32 increments the variable N (Step S220).

$$\Delta R = R_N - R_{N+1} \quad (2)$$

$$\Delta OCV = OCV_N - OCV_{N+1} \quad (3)$$

Until the variable N exceeds a value (n−1), or until the internal resistance differences ΔR and the open circuit voltage differences ΔOCV over all of the battery blocks B1–Bn have been processed, the CPU 32 repeats the processing of Steps S218 and S220 (Step S222). Then, the CPU 32 processes the maximum value (the maximum internal resistance difference) ΔRmax among the operated internal resistance differences ΔR and the maximum value (the maximum open circuit voltage difference) ΔOCVmax among the operated open circuit voltage differences ΔOCV (Step S224). The CPU 32 judges whether or not the operated maximum internal resistance difference ΔRmax and the operated maximum open circuit voltage difference ΔOCVmax are respectively equal to threshold values Rref and OCVref or less (Step S226). When both of the maximum internal resistance difference ΔRmax and the maximum open circuit voltage difference ΔOCVmax are respectively equal to the threshold values Rref and OCVref or less, the CPU 32 judges that the assembled battery 10 is normal (Step S228), and then the CPU 32 ends the present routine. When the maximum internal resistance difference ΔRmax exceeds the threshold value Rref, the CPU 32 judges that there is a cell having an abnormality in the internal resistance thereof in the assembled battery 10, and, for example, outputs a lighting signal indicating the abnormality of the internal resistance to the LED 50 (Step S230) to end the present routine. Moreover, when the maximum open circuit voltage difference ΔOCVmax exceeds the threshold value OCVref, the CPU 32 judges that there is a cell having an abnormality in the open circuit voltage thereof in the assembled battery 10, and, for example, outputs a lighting signal indicating the abnormality of the open circuit voltage to the LED 50 (Step S232) to end the present routine. Here, the use of the maximum internal resistance difference ΔRmax and the maximum open circuit voltage difference ΔOCVmax as the judgment objects of the abnormalities of the internal resistance and the open circuit voltage, respectively, is based on the fact that the use of the maximum internal resistance difference ΔRmax and the maximum open circuit voltage difference ΔOCVmax as the judgment objects makes it possible to judge whether or not at least any one of the cells in the assembled battery 10 has an abnormality with respect to the internal resistance or an abnormality of the open circuit voltage. Incidentally, when the CPU 32 specifies the battery block in which an abnormal cell exists, it is enough to perform the comparison of all of the internal resistance differences ΔR and the open circuit voltage differences ΔOCV calculated at Step S224 with the threshold values Rref and OCVref, respectively, without deriving the maximum internal resistance difference ΔRmax and the maximum open circuit voltage difference ΔOCVmax.

As described above, the apparatus 20 for judging the state of an assembled battery of the example detects the respective currents I1–In at the same time as detecting the respective voltages V1–Vn of the battery blocks B1–Bn, and stores a plurality of coupled data of the obtained voltages and the currents for each of the battery blocks B1–Bn. Furthermore, the apparatus 20 calculates a linear relationship for each of the battery blocks B1–Bn from the plural coupled data. The apparatus 20 derives internal resistance (an gradient) and an open circuit voltage (an intercept) from the linear relationship to judge the abnormalities of the assembled battery. Consequently, even when the respective voltages V1–Vn of the respective battery blocks B1–Bn are detected at different times, the abnormalities of the internal resistance and the open circuit voltage of the assembled battery 10 can be judged precisely. It goes without saying that, because the apparatus 20 detects the respective voltages V1–Vn of the respective battery blocks B1–Bn using the voltmeter 23, there is no need to provide a voltmeter for each of the battery blocks B1–Bn, thereby making it possible to lower the cost of the apparatus.

Although the apparatus 20 for judging the state of an assembled battery of the example is made to judge the abnormalities of both the internal resistance and the open circuit voltages of the assembled battery 10, the apparatus may be configured to judge only the abnormalities of one or the other of them.

Figure 8:
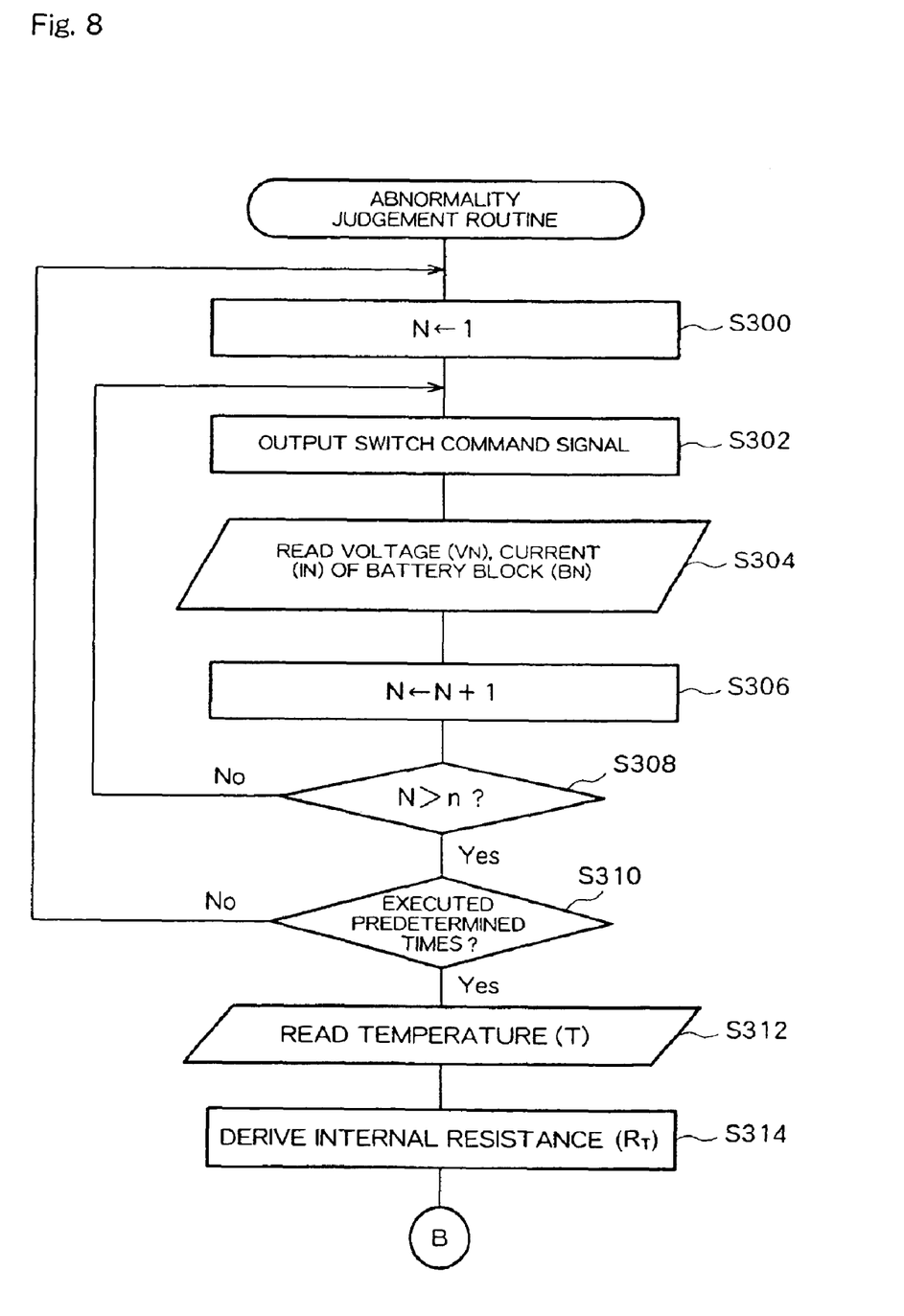
FIG. 8 is a flowchart showing an example of an abnormality judgment routine executed by an electronic control unit of an apparatus for judging the state of an assembled battery of a modified example.
Figure 9:
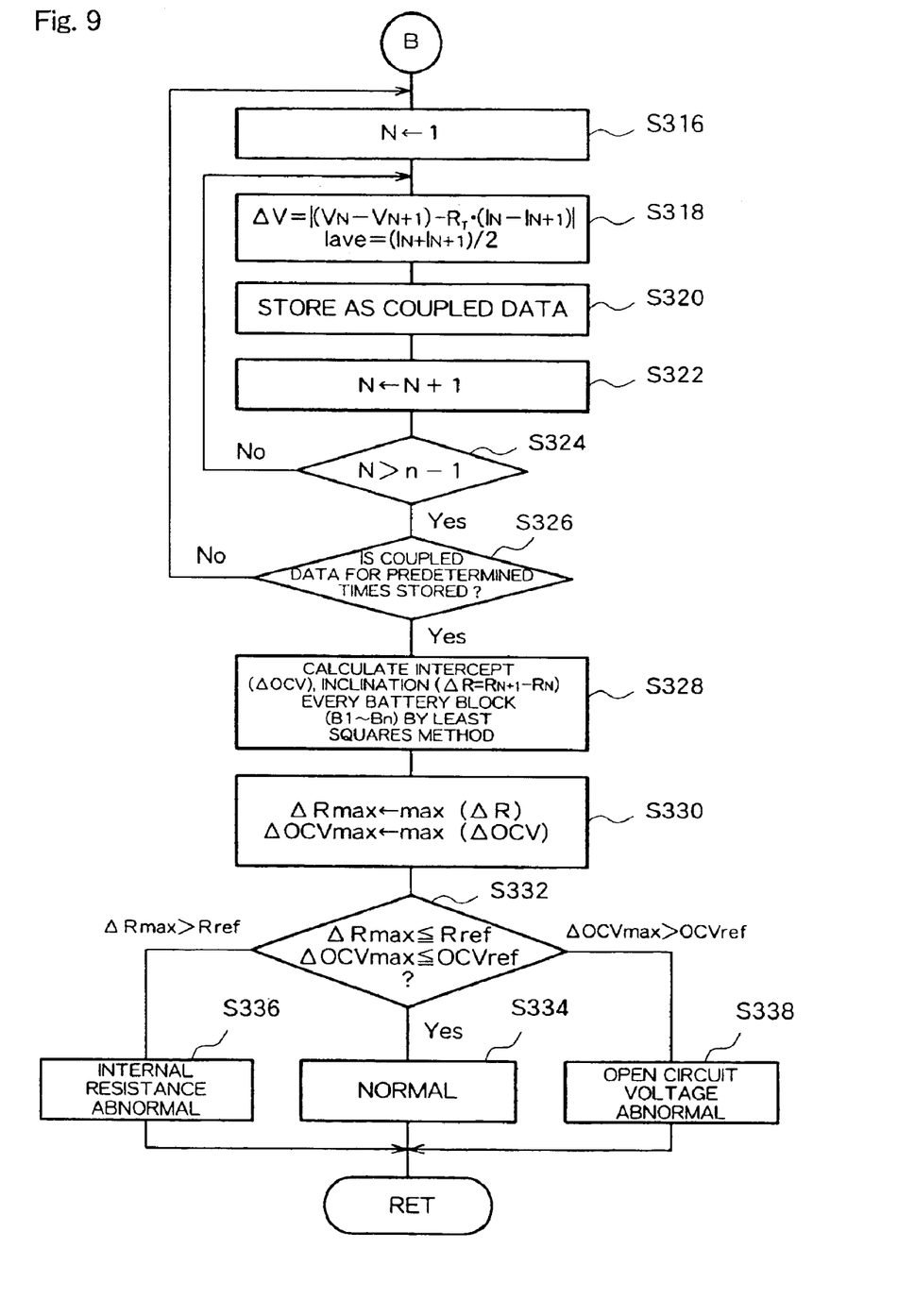
FIG. 9 is a flowchart showing the example of the abnormality judgment routine executed by the electronic control unit of the apparatus for judging the state of the assembled battery of the modified example.

The apparatus 20 for judging the state of an assembled battery of the example is configured to store the voltages and the currents detected from each of the battery blocks B1–Bn as a plurality of coupled data for calculating a linear relationship from the plural coupled data. The apparatus 20 then calculates the internal resistance R1–Rn and the open circuit voltages OCV1–OCVn of respective battery blocks B1–Bn, and calculates the internal resistance differences ΔR and the open circuit voltage differences ΔOCV. However, other methods maybe adopted. For example, a voltage difference ΔV is obtained by correcting the deviation between two voltages among the voltages V1–Vn of the battery blocks B1–Bn using the magnitude of the voltage drop thereof, and an average (a current average) Iave of the two currents corresponding to the two voltages is obtained. The voltage difference ΔV and the current average Iave are coupled to make coupled data. A plurality of items of coupled data are stored, and a linear relationship is derived from the plural coupled data to calculate the internal resistance difference ΔR and the open circuit voltage difference ΔOCV. More specifically, the abnormality judgment routine shown in FIGS. 8 and 9 is executed in place of the abnormality routine shown in FIGS. 5 and 6 in this example.

When the abnormality judgment routine is executed, the CPU 32 of the electronic control unit 30 first performs processing similar to the processing from Step S100 to Step S108 of the abnormality judgment routine in FIG. 2. That is, the CPU 32 sets the variable N to be a value 1 (Step S300), and outputs a switch command signal corresponding to the set value of the variable N (Step S302). The CPU 32 reads a voltage VN and an current IN of the battery block BN corresponding to the variable N (Step S304), and increments the variable N (Step S306). The CPU 32 repeats the processing from Step S302 to Step S306 until the variable N exceeds the value n, namely the CPU 32 has read the voltages V1–Vn of all of the battery blocks B1–Bn and the currents I1–In (Step S308). Then, the CPU 32 judges whether the processing from Step S300 to Step S308 has repeated a predetermined number of times or not (Step S310) The CPU 32 repeats the processing until the processing has been executed the predetermined number of times. The repetition of the processing from Step S300 to Step S308 the predetermined number of times is to obtain a plurality of coupled data, which will be described later, to perform operations using the least squares method. A numerical value for the predetermined number of times is set as the number of the coupled data sufficient for judging the abnormality of the assembled battery 10. After the repetition of the processing the predetermined number of times, the CPU 32 reads the temperature T of the assembled battery 10 (Step S312), and derives the internal resistance R of the assembled battery 10 from the read temperature T (Step S314). Incidentally, the processing of driving the internal resistance R is the same as the processing at Steps S110 and S112 in the routine of FIG. 2.

Next, the CPU 32 sets the value of the variable N to 1 (Step S316). The CPU 32 derives a voltage difference ΔV by means of an expression similar to Expression (1), and derives a current average Iave corresponding to the voltage difference ΔV by the use of the following expression (Expression (4)) (Step S318). The CPU 32 stores the voltage difference ΔV and the current average Iave as coupled data (Step S320).

$$Iave = (I_N + I_{N+1})/2 \quad (4)$$

Then, the CPU 32 increments the variable N (Step S322). Until the variable N exceeds a value (n−1), or until the voltage differences ΔV of all of the groups including all the battery blocks B1–Bn, each of which groups is composed of two blocks of the battery blocks B1–Bn (for example, B1 and B2, B3 and B4, . . . , Bn−1 and Bn, or the like), have been derived, the CPU 32 repeats the processing from Step S318 to Step S322 (Step S324).

Thus, when the CPU 32 stores the voltage difference ΔV and the current average Iave as the coupled data for every group of battery blocks B1–Bn, the CPU 32 judges whether the storage of the coupled data of each of the groups has been performed the predetermined number of times in Step S310 or not, namely the CPU 32 judges whether the coupled data of each of the groups is stored a sufficient number of times for performing the least squares operations or not (Step S326). The CPU 32 repeats the processing from Step S316 to Step S324 until the coupled data is stored the predetermined number of times.

Figure 10:
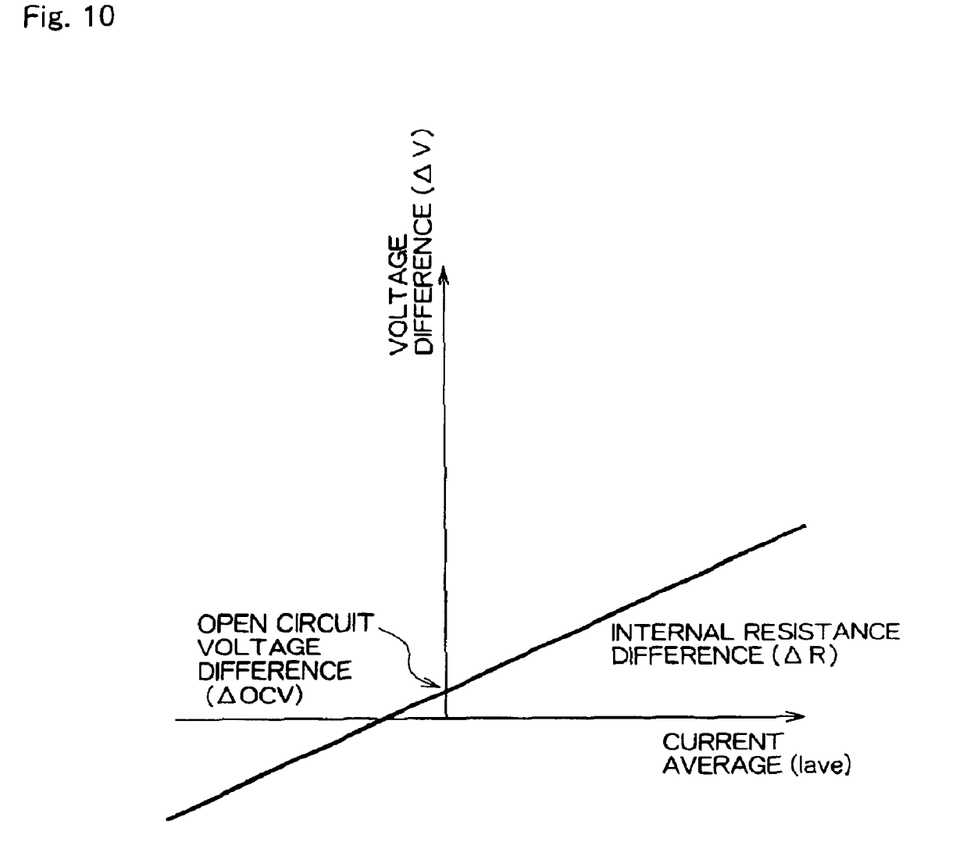
FIG. 10 is an explanatory view showing a relationship among voltage difference $\Delta V$, current average Iave, an open circuit voltage difference $\Delta OCV$ and an internal resistance difference $\Delta R$.

When the coupled data is stored the predetermined number of times for each group, the CPU 32 calculates the gradient (the internal resistance difference) ΔR and the intercept (the open circuit voltage difference) ΔOCV of each group of battery blocks B1–Bn by means of calculation using the least squares method (Step S328). Because a relationship among voltage differences ΔV, current averages Iave, an internal resistance difference ΔR and an electromotive force difference ΔOCV can be represented as one shown in FIG. 10, the linear relationship between the voltage differences ΔV and the current averages Iave can be calculated by means of the least squares method when a plurality of the coupled data (the voltage differences ΔV and the current averages Iave) for the battery blocks B1–Bn are stored. Then, the internal resistance difference ΔR and the electromotive force difference ΔOCV, or the gradient and the intercept of the linear relationship respectively, can be derived.

When the internal resistance difference ΔR and the open circuit voltage difference ΔOCV are calculated in the manner described above, the CPU 32 calculates the maximum internal resistance difference ΔRmax, or the maximum value among the internal resistance differences ΔR of respective groups, and calculates the maximum open circuit voltage difference ΔOCVmax, or the maximum value among the open circuit voltage differences ΔOCV of respective groups (Step S330). The CPU 32 judges whether or not the maximum internal resistance difference ΔRmax and the maximum open circuit voltage difference ΔOCVmax are respectively equal to the threshold values Rref and OCVref or less (Step S332). When both the maximum internal resistance difference ΔRmax and the maximum-open circuit voltage difference ΔOCVmax are respectively judged to be equal to the threshold values Rref and OCVref or less, the CPU 32 judges that the assembled battery 10 is normal (Step S334), and then the CPU 32 ends the present routine. When the maximum internal resistance difference ΔRmax exceeds the threshold value Rref, the CPU 32 judges that there is a cell having an abnormality in the internal resistance thereof in the assembled battery 10, and, for example, outputs a lighting signal indicating the abnormality of the internal resistance to the LED 50 (Step S336) to end the present routine. Moreover, when the maximum open circuit voltage difference ΔOCVmax exceeds the threshold value OCVref, the CPU 32 judges that there is a cell having an abnormality in the open circuit voltage thereof in the assembled battery 10 (Step S338), and ends the present routine.

According to the apparatus for judging the state of an assembled battery of the modified example also, advantages similar to those of the apparatus for judging the state of an assembled battery of the example can be obtained.

According to one aspect of the present invention abovementioned, an apparatus for judging the state of an assembled battery of the example and the modified example thereof judges the existence of overdischarges of an assembled battery on the basis of voltage differences among a plurality of battery blocks, and judges abnormalities owing to the internal resistance of the assembled battery or owing to the open circuit voltage of the assembled battery on the basis of the internal resistance differences or the open circuit voltage differences of the plural battery blocks. However, because of the precision required for the judgment of the sate of an assembled battery, the abnormalities of the assembled battery may be judged on the basis of individual voltages, internal resistance and open circuit voltages of a plurality of battery blocks without using the deviations described above.

In the above, the preferred embodiment of the present invention is described by means of the example. However, the present invention is not limited to the example, and it goes without saying that the present invention can be implemented by adopting various forms within the spirit and scope of the present invention.

INDUSTRIAL APPLICABILITY

As described above, the apparatus for judging the state of an assembled battery according to the present invention can accurately judge the state of the battery by the use of an apparatus which cannot detect the voltage of each of a plurality of battery blocks simultaneously, and can accurately judge the state of the battery by the use of a more inexpensive apparatus.

What is claimed is:

1. An apparatus for judging a state of an assembled battery composed of a plurality of battery blocks connected in series, said apparatus comprising:

voltage measuring means for measuring respective voltages of said plural battery blocks at different times;

current measuring means for measuring currents flowing through said assembled battery; and state judgment means for judging the state of said assembled battery by means of the respective voltages of said plural battery blocks, which are measured by said voltage measuring means at the different times, and respective currents measured by said current measuring means correspondingly to the respective voltages at the same time as the respective voltages are measured, wherein said state judgment means is means for judging existence of an overdischarge of said assembled battery on the basis of the respective voltages measured by said voltage measuring means, the respective currents measured by said current measuring means corresponding to the respective voltages, and internal resistance of said assembled battery corresponding to temperature of said assembled battery.

2. The apparatus for judging the state of the assembled battery according to claim 1, wherein said state judgment means is means for judging the existence of the overdischarge of said assembled battery in consideration of voltage drops of the respective voltages owing to the respective currents and the internal resistance of said assembled battery from the respective voltages.

3. The apparatus for judging the state of the assembled battery according to claim 2, wherein said state judgment means is means for correcting a deviation of two voltages among the respective voltages of said plural battery blocks on the basis of two currents corresponding to the two voltages among the respective currents and of the internal resistance to judge the overdischarge when an absolute value of the corrected deviation is larger than a predetermined value.

4. An apparatus for judging a state of an assembled battery composed of a plurality of battery blocks connected in series, said apparatus comprising:

voltage measuring means for measuring respective voltages of said plurality of battery blocks at different times;

current measuring means for measuring currents flowing through said assembled 3battery;

state judgment means for judging the state of said assembled battery by means of the respective voltages of said plurality of battery blocks, which are measured by said voltage measuring means at the different times, and respective currents measured by said current measuring means correspondingly to the respective voltages at the same time as the respective voltages are measured; and storage means for storing the respective voltages of said plurality of battery blocks, which are measured by said voltage measuring means at the different times, and the respective currents measured by said current measuring means corresponding to the respective voltages at the same time as the respective voltages are measured as a plurality of coupled data, each of which corresponds to each of said plural battery blocks, wherein said state judgment means is means for deriving a linear relationship between the voltages and the currents to each of said plurality of battery blocks on a basis of the plurality of coupled data stored in said storage means, and for calculating an open circuit voltage of each of said plurality of battery blocks on the basis of the derived linear relationships to judge existence of an abnormality of said assembled battery on the basis of the calculated open circuit voltage each of said battery blocks, and wherein said state judgment means is means for judging the state of said assembled battery to be abnormal when an open circuit voltage difference in two blocks among said plurality of battery blocks is larger than a predetermined open circuit voltage difference value.

5. An apparatus for judging a state of an assembled battery composed of a plurality of battery blocks connected in series, said apparatus comprising:

voltage measuring means for measuring respective voltages of said plural battery blocks at different times;

current measuring means for measuring currents flowing through said assembled battery;

state judgment means for judging the state of said assembled battery by means of the respective voltages of said plural battery blocks, which are measured by said voltage measuring means at the different times, and respective currents measured by said current measuring means correspondingly to the respective voltages at the same time as the respective voltages are measured;

correction means for correcting a deviation of two voltages among the respective voltages of said plural battery blocks, which are measured by said voltage measuring means at the different times, on the basis of two currents corresponding to the two voltages among the respective currents measured by said current measuring means corresponding to the respective voltages at the same time as the respective voltages are measured, and of internal resistance of said assembled battery corresponding to a temperature of said assembled battery; and storage means for storing a plurality of coupled data, each of which is composed of the corrected deviation of the two voltages and an average of the two currents corresponding to the two voltages, wherein said state judgment means is means for deriving a linear relationship between the deviations of the two voltages and the averages of the two currents of said plural battery blocks on the basis of the plural coupled data stored in said storage means, and for calculating an open circuit voltage difference of two blocks of said plural battery blocks on the basis of the operated linear relationship to judge an abnormality of said assembled battery on the basis of the calculated open circuit voltage difference.

6. The apparatus for judging the state of the assembled battery according to claim 5, wherein said state judgment means is means for judging the state of said assembled battery to be abnormal when the open circuit voltage difference in the two blocks is larger than a first predetermined open circuit voltage difference value.

* * * * *

UNITED STATES PATENT AND TRADEMARK OFFICE
CERTIFICATE OF CORRECTION

PATENT NO. : 7,129,707 B2
APPLICATION NO. : 10/489201
DATED : October 31, 2006
INVENTOR(S) : Yoshiaki Kikuchi It is certified that error appears in the above-identified patent and that said Letters Patent is hereby corrected as shown below:

On the Title Page, under "FOREIGN PATENT DOCUMENTS", insert:

--JP 2000-260481    09/2000

JP 08-336202    12/1996--

| Column | Line | |
|---|---|---|
| 1 | 39 | Change "though" to --through--. |
| 1 | 40 | After "flowing" insert --through--. |
| 1 | 42 | Change "this in fact normal" to --this is, in fact, normal.--. |
| 1 | 44 | After "flowing" insert --through--. |
| 2 | 43 | Change "spondingly" to --sponding--. |
| 3 | 56 | Change "out line" to --outline--. |
| 4 | 18 | Change "unit of an apparatus" to --unit 30 of an apparatus 20--. |
| 4 | 22 | Change "unit of an apparatus" to --unit 30 of an apparatus 20--. |

| Column | Line | |
|---|---|---|
| 5 | 29 | Change "CPU 32" to --CPU 32--. |
| 5 | 33 | Change "battery blocks B-Bn" to --battery blocks B1-Bn--. |
| 5 | 45 | Change "blocks Bl-Bn" to --blocks B1-Bn--. |
| 7 | 17 | Change "apparatuse" to --apparatus--. |
| 7 | 40 | Change "(Step 5304)" to --(Step S304)--. |
| 7 | 42 | Change "Step 5306" to --Step S306--. |

UNITED STATES PATENT AND TRADEMARK OFFICE
CERTIFICATE OF CORRECTION

PATENT NO. : 7,129,707 B2
APPLICATION NO. : 10/489201
DATED : October 31, 2006
INVENTOR(S) : Yoshiaki Kikuchi

It is certified that error appears in the above-identified patent and that said Letters Patent is hereby corrected as shown below:

| | | |
|---|---|---|
| 7 | 62 | Change "driving" to --deriving--. |
| 8 | 30 | Change "electro motive" to --electromotive--. |
| 9 | 4 | Change "(an gradient)" to --(a gradient)--. |

| Column | Line | |
|---|---|---|
| 10 | 36 | Change "resistance R" to --resistance $\mathbf{R}_T$--. |
| 10 | 38 | Change "the processing of driving" to --the process of deriving--. |
| 10 | 39 | Change "R is the same as the processing" to --$\mathbf{R}_T$ is the same as the process--. |
| 10 | 54 | Change "groups" to --group--. |
| 11 | 33 | Change "maximum-open" to --maximum open--. |
| 11 | 63 | Change "sate" to --state--. |
| 12 | 64 | Change "3battery" to --battery--. |

Signed and Sealed this

Twenty-seventh Day of March, 2007

JON W. DUDAS
*Director of the United States Patent and Trademark Office*